United States Patent Office

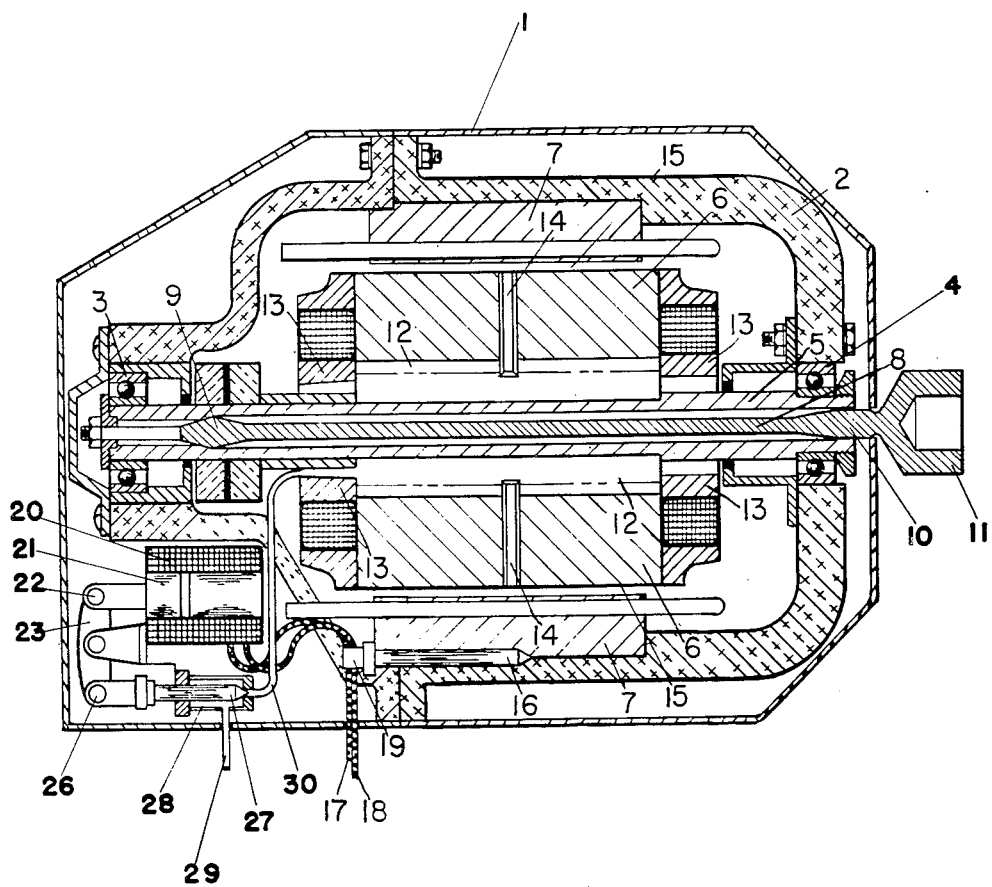

2,773,201
Patented Dec. 4, 1956

2,773,201

METHOD FOR EVAPORATIVE COOLING OF ROTATING ELECTRICAL MACHINERY

Cecil G. Martin, Cleveland, and Harold H. Humpal, Maple Heights, Ohio, assignors to Jack & Heintz, Inc., Cleveland, Ohio, a corporation of Delaware Application April 16, 1954, Serial No. 423,636

3 Claims. (Cl. 310—54)

This invention relates in general to rotating electrical machines and more particularly to improvements in liquid cooling systems therefor.

Among the objects of our invention are the provision of a more efficient liquid evaporative cooling system, a system for more accurately and safely controlling the temperature under a wide range of atmospheric densities and load conditions and an increase in power handling capacity of the rotor of the electrical machine.

We have discovered that in designing for best cooling characteristics of rotating electrical machines, the greatest benefit may be realized by applying the liquid coolant as near as possible to the source of the main heat losses in the machine. For evaporative cooled machines, this has been commonly accomplished by injecting the evaporant into the air gap from simple passages in either the rotor or the stator. The cooling mechanism then consists of boiling from the stator inner surface with attendant high heat transfer on the stator surface and steam film forced convection heat transfer on the rotor surface with much lower rotor heat transfer resulting.

Because of the low rotor heat transfer, such a system is limited to very low rotor losses to prevent overheating and results in the hottest spot being located in the rotor. Since the temperature control is most easily placed in the stator, the rotor hot spot is difficult to control under wide ranges of load and atmospheric densities with this type of design.

By means of our invention, we propose to eliminate this difficulty by injecting the evaporant to an inner surface of the rotor where centrifugal force will maintain the fluid in contact with the surface and boiling where high heat transfer will take place. Annular baffles protruding radially inward from the rotor surface at the ends of the rotor stack are employed to confine the liquid to the inner surface. Then tubes extending radially outward through the rotor to the air gap and protruding radially inward from the inner rotor surface far enough to maintain the liquid on the inner rotor surface at the desired level are used to convey the liquid to the air gap as demanded by a temperature control located on the stator. By such means, it is possible to increase the power handling capacity of the rotor, eliminate the adverse effects of load and rarified atmospheric conditions on rotor temperature, shift the hot spot location to the stator where it may be more easily controlled and decrease the tendency toward excessive consumption of the coolant liquid employed.

With the foregoing and other objects in view, the invention resides in the combination of parts and in the details of construction hereinafter set forth in the following specification and appended claims, a certain embodiment thereof being illustrated in the accompanying drawing, which is a view in longitudinal section taken through a rotating electrical machine and our improved cooling system and automatic thermally responsive control means therefor.

Referring more particularly to the drawing, we have shown a rotating electrical machine including a housing 1 for enclosing a stationary mounting frame 2 with end bearings 3 and 4 for rotatably supporting a hollow rotor shaft 5. The rotor 6 is rigid with shaft 5 and is located concentrically inside of a stator 7. Inside of hollow shaft 5 is the usual flexible quill shaft 8 splined at 9 and 10 to shaft 5 and provided at the right end with a member 11 to be driven by a pulsating power source, such as an engine.

As stated before, we propose to inject the coolant evaporant to an inner surface of the rotor 6, as shown at 12, where centrifugal force will maintain a column 12 of the liquid coolant, as distinguished from a mere film, in contact with this inner rotor surface so that it will boil where the high heat transfer takes place. Annular baffles 13 protruding radially inward from the rotor surface at the ends of the rotor stack are employed to confine the liquid to this inner surface at 12. Also, tubes 14 are provided to extend radially outward through the rotor to the air gap 15, between the rotor and stator. These tubes 14 also protrude radially inward from the inner rotor surface far enough to maintain the liquid on the inner rotor surface at 12, at the desired level in order to convey the liquid coolant to the air gap 15 as demanded by a temperature control located on the stator.

This temperature control may include thermally responsive bi-metallic member 16 located in the stator 7 at a point where, under normal operating conditions of the machine, the heat is greatest. Leads 17 and 18 from a suitable electrical source pass through a suitable switch box 19 to a plunger type solenoid, generally shown at 20.

The plunger 21 of the solenoid 20 is pivotally connected at 22 to a link 23, which, in turn, is pivotally connected at 26 to a needle valve 27 that is slidably mounted in a hollow cylinder 28. Liquid coolant is supplied under pressure from a suitable external source through a pipe 29 to the cylinder 28 and from the cylinder 28 through a pipe 30 to the rotor inner surface, as shown at 12. The needle valve 28 is shown in the drawing to be in a closed position, preventing flow of coolant through pipe 30 into the rotor inner surface.

This represents the normal condition when excessive heat is not present in the machine. Under the centrifugal force of the rotation of the rotor 6, the column of liquid coolant in contact with the inner surface of the rotor is maintained at a level just short of spilling into the radial tubes 14.

When, however, the thermal element 16 senses a predetermined degree of excessive heat, it acts to close a switch in the switch box 19 to energize the solenoid 20. This causes a movement of plunger 21 from left to right. Through the linkage, link 23 pulls the needle valve 28 from right to left, and off of its valve seat, to open pipe 30 to an added supply of liquid coolant from pipe 29. This coolant liquid flow continues, causing an overflow from the normal level, as shown at 12, into tubes 14 and radially outwardly into the air gap 15. This not only quickly cools the rotor, but the stator, as well.

When this combined cooling effect has accomplished its desired purpose, the thermal element 16 quickly reacts to open the switch in switch box 19 so as to de-energize the solenoid. It is to be understood that conventional spring means may be employed to return the plunger 21 and needle valve 28 to their normal positions, as shown in the drawing, upon de-energization of the solenoid.

It will be seen from the foregoing that we have provided a liquid coolant circulating system whereby it is possible to increase the power handling capacity of the rotor, eliminate the adverse effects of load and rarified atmospheric conditions on rotor temperature, shift the hot spot location to the stator where it may be more easily controlled, and decrease the tendency toward excessive water consumption of the coolant liquid employed.

We claim:

1. In a rotating electrical machine including a housing and a stationary mounting frame therein, a stator and a hollow rotor mounted inside of said stator with an air gap therebetween, a rotatably driven shaft rigid with said rotor and supported by said frame, a supply line for supplying coolant liquid under pressure from an external source to the internal annular surface of said hollow rotor to be vaporized in said machine into an evaporant, a hollow tube extending radially inwardly from said air gap to a point radially inwardly disposed with respect to the internal surface of said rotor to maintain a reservoir of a predetermined column of liquid coolant, through the centrifugal force of the rotation of said rotor, before being conveyed through said tube to said air gap upon the occurrence of coolant liquid in excess of said predetermined column, a thermally responsive element carried by said stator, valve means for controlling the supply of coolant liquid to said rotor, electrically actuated means for normally maintaining said valve means closed, an external electric power source and a normally open switch means in circuit with said electrically actuated means and electric power source, said thermally responsive element, upon exposure to the existence of a predetermined degree of heat, being adapted to close said switch means and actuate said electrically actuated means to open said valve means to supply additional coolant liquid to said rotor and convey evaporant therefrom through said tube to said air gap to cool said stator.

2. In a rotating electrical machine including a housing and a stationary mounting frame therein, a stator and a hollow rotor mounted inside of said stator with an air gap therebetween, a rotatably driven shaft rigid with said rotor and supported by said frame, a supply line for supplying coolant liquid under pressure from an external source to the internal annular surface of said hollow rotor to be vaporized in said machine into an evaporant, a hollow tube extending radially inwardly from said air gap to a point radially inwardly disposed with respect to the internal surface of said rotor to maintain a reservoir of a predetermined column of liquid coolant, through the centrifugal force of the rotation of said rotor, before being conveyed through said tube to said air gap upon the occurrence of coolant liquid in excess of said predetermined column, a thermally responsive bi-metallic element carried by said stator, valve means for controlling the supply of coolant liquid to said rotor, a solenoid, a plunger connected to said solenoid and said valve and spring actuated to normally maintain said needle valve closed, an external electric power source and a normally open switch means in circuit with said solenoid and electric power source, said thermally responsive element, upon exposure to the existence of a predetermined degree of heat, being adapted to close said switch means and actuate said solenoid to open said valve means to supply additional coolant liquid to said rotor and convey evaporant therefrom through said tube to said air gap to cool said stator.

3. In a rotating electrical machine including a housing and a stationary mounting frame therein, a stator and a hollow rotor mounted inside of said stator with an air gap therebetween, a rotatably driven shaft rigid with said rotor and supported by said frame, a supply line for supplying coolant liquid under pressure from an external source to the internal annular surface of said hollow rotor to be vaporized in said machine into an evaporant, a plurality of circumferentially spaced hollow tubes each extending radially inwardly from said air gap each to a point radially inwardly disposed with respect to the internal surface of said rotor to maintain a reservoir of a predetermined column of liquid coolant, through the centrifugal force of the rotation of said rotor, before being conveyed through said tubes to said air gap upon the occurrence of coolant liquid in excess of said predetermined column, a thermally responsive bi-metallic element embedded in said stator, a needle valve for controlling the supply of coolant liquid to said rotor, a solenoid a plunger connected to said solenoid and to said needle valve and spring actuated to normally maintain said needle valve closed, an external electric power source and a normally open switch means in circuit with said solenoid and electric power source, said thermally responsive element, upon exposure to the existence of a predetermined degree of heat, being adapted to close said switch means and actuate said solenoid to open said needle valve to supply additional coolant liquid to said rotor and convey evaporant therefrom through said tubes to said air gap to cool said stator.

References Cited in the file of this patent

UNITED STATES PATENTS

| 255,137 | Brown | Mar. 21, 1882 |
| 1,121,014 | Hobart | Dec. 15, 1914 |
| 2,604,500 | Dekoning | July 22, 1952 |

FOREIGN PATENTS

| 194,333 | Germany | Jan. 14, 1908 |